(12) United States Patent
Wakashima et al.

(10) Patent No.: US 11,558,575 B2
(45) Date of Patent: Jan. 17, 2023

(54) ANALOG-TO-DIGITAL CONVERTER HAVING REFERENCE SIGNAL, IMAGE SENSOR, AND IMAGE CAPTURING APPARATUS

(71) Applicant: CANON KABUSHIKI KAISHA, Tokyo (JP)

(72) Inventors: Shunichi Wakashima, Tokyo (JP); Hirokazu Kobayashi, Tokyo (JP); Nobuhiro Takeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/173,695

(22) Filed: Feb. 11, 2021

(65) Prior Publication Data

US 2021/0258524 A1 Aug. 19, 2021

(30) Foreign Application Priority Data

Feb. 17, 2020 (JP) .............................. JP2020-024664

(51) Int. Cl.
*H04N 5/378* (2011.01)
*H04N 5/232* (2006.01)

(52) U.S. Cl.
CPC ......... *H04N 5/378* (2013.01); *H04N 5/23245* (2013.01)

(58) Field of Classification Search
CPC ................. H04N 5/335–379; H03M 1/34–468
See application file for complete search history.

(56) References Cited

U.S. PATENT DOCUMENTS

| 2011/0114827 | A1* | 5/2011 | Yamaoka | H03K 7/08 250/214 R |
| 2012/0169909 | A1* | 7/2012 | Rysinski | H04N 5/374 348/E5.091 |
| 2014/0036124 | A1* | 2/2014 | Higuchi | H03M 1/0612 341/169 |
| 2015/0076325 | A1* | 3/2015 | Higuchi | H01L 27/14645 327/134 |
| 2015/0109506 | A1* | 4/2015 | Aibara | H04N 5/37455 348/308 |
| 2015/0244388 | A1* | 8/2015 | Hashimoto | H04N 5/378 341/137 |
| 2016/0021323 | A1* | 1/2016 | Aibara | H04N 5/3742 348/294 |
| 2019/0327430 | A1* | 10/2019 | Kawazu | H04N 5/37455 |

FOREIGN PATENT DOCUMENTS

JP 2013-009087 A 1/2013

* cited by examiner

*Primary Examiner* — Paul M Berardesca
(74) *Attorney, Agent, or Firm* — Canon U.S.A., Inc. IP Division

(57) ABSTRACT

An analog-to-digital converter includes a generator, a comparator, and a counter. The generator generates a reference signal whose voltage changes with respect to time. The voltage of the reference signal changes with a constant slope in a predetermined first period since the voltage starts changing. The slope of the voltage becomes steeper with respect to time in a second period after the first period. The comparator compares the reference signal and a voltage output from outside, and outputs a comparison result. The counter counts at a predetermined first cycle since the voltage of the reference signal starts changing until the comparison result is inverted.

13 Claims, 10 Drawing Sheets

ANALOG-TO-DIGITAL CONVERTER HAVING REFERENCE SIGNAL, IMAGE SENSOR, AND IMAGE CAPTURING APPARATUS

BACKGROUND

Technical Field

One disclosed aspect of the embodiments relates to an analog-to-digital converter, and an image sensor and an image capturing apparatus equipped with an analog-to-digital converter.

Description of the Related Art

In recent years, image sensors such as Complementary Metal Oxide Semiconductor (CMOS) image sensors have been widely used in image capturing apparatuses such as digital still cameras and digital video cameras. Recently, many of these image sensors are equipped with analog-to-digital (AD) converters that perform AD conversion each arranged for each column of pixels arranged in a matrix, so that signals can be read out at high speed. As one method of the AD conversion, a method of acquiring an AD conversion result corresponding to a pixel output voltage output from each pixel by, using comparators each arranged for each column, comparing the pixel output voltage with a reference signal whose voltage changes with time is known.

Japanese Patent Laid-Open No. 2013-009087 discloses a method that uses two types of reference signals having different slopes (rates of change in voltage with respect to time) as a technique for further speeding-up the AD conversion using the above-descried method. In this method, it is determined whether the pixel output voltage is of a high-luminance signal or a low-luminance signal before the AD conversion is performed, and based on the determination result, a reference signal having a slope suitable for the pixel output voltage is used in the comparison processing.

In an image capturing apparatus equipped with AD converters each having the above configuration, conversion gains when converting a voltage to a digital signal are different. For this reason, after reading out the digital signals from the image sensor, digital gains corresponding to the used reference signals are applied to adjust the total gain applied to each signal.

Further, the gentler the slope of the reference signal is, the smaller the ratio of conversion noise to the pixel output voltage input to the AD converter becomes, and the steeper the slope of the reference signal is, the shorter the time taken to convert the pixel output voltage becomes. Therefore, a reference signal having a gentle slope is used for the low-luminance pixel output voltage (that is, low voltage), and a reference signal having a steep slope is used for the high-luminance pixel output voltage (that is, high voltage). By doing so, it is possible to suppress reading noise when illuminance is low and shorten the time taken to AD-convert a high-luminance signal having a large signal amplitude.

However, in the above configuration, the gap between signals and the gap between noises as described below may occur due to the accuracy of correcting a ratio between the conversion gains using the digital gains, the difference in the wiring layout for providing the two types of reference signals, and so forth. That is, an error in the total gain of the conversion gain and the digital gain causes a signal gap between the digital signal converted using one reference signal and the digital signal converted using the other reference signal of the pixel output voltages having values near a threshold set for judging a reference signal to be used. Therefore, there should ideally be a certain relationship (for example, proportional) between the light intensity and the magnitude of the digital signal obtained by the AD conversion, but due to the signal gap that occurs between the digital signals corresponding to the pixel output voltages near the threshold for the judgement, there is a problem that this certain relationship is broken.

Further, since the slope of the reference signal affects the conversion noise, the reading noise differs depending on which of the reference signals is used for conversion. Furthermore, since which of the reference signals is to be used is determined by using the signal before the correlated double sampling is applied, different reference signals may be used for signals corresponding to the same amount of light depending on the variation on the threshold of the amplification transistor included in each pixel, the reset noise of the charge-voltage converter, and the like, and a difference in noise may be recognized with respect to the same amount of light. In addition, time for determining which reference signal to use is needed.

SUMMARY

One embodiment has been made in consideration of the above situation, and enables high-speed AD conversion while reducing gaps between signals and noises.

According to one aspect of the embodiments, an analog-to-digital converter includes a generator, a comparator, and a counter. The generator generates a reference signal whose voltage changes with respect to time. The voltage of the reference signal changes with a constant slope in a predetermined first period since the voltage starts changing. The slope of the voltage becomes steeper with respect to time in a second period after the first period. The comparator compares the reference signal and a voltage output from outside, and outputs a comparison result. The counter counts at a predetermined first cycle since the voltage of the reference signal starts changing until the comparison result is inverted.

Further, according to another aspect of the embodiments, an image sensor includes a plurality of pixels and an analog-to-digital converter. Each of the plurality of pixels includes a photoelectric converter that generates an electric signal corresponding to an amount of incident light and a converter that converts the electric signal transmitted from the photoelectric converter to a voltage. The analog-to-digital converter includes a generator, a comparator, and a counter. The generator generates a reference signal whose voltage changes with respect to time. The voltage of the reference signal changes with a constant slope in a predetermined first period since the voltage starts changing. The slope of the voltage becomes steeper with respect to time in a second period after the first period. The comparator compares the reference signal and a voltage output from outside, and outputs a comparison result. The counter counts at a predetermined first cycle since the voltage of the reference signal starts changing until the comparison result is inverted. The analog-to-digital converter converts the voltage output from the pixel into a digital signal.

Furthermore, according to another aspect of the embodiments, an image capturing apparatus includes an image sensor and a correction unit. The image sensor includes a plurality of pixels and an analog-to-digital converter. Each of the plurality of pixels includes a photoelectric converter that generates an electric signal corresponding to an amount of incident light and a converter that converts the electric signal transmitted from the photoelectric converter to a voltage. The analog-to-digital converter includes a generator, a comparator, a counter, a first storage circuit, and a second storage circuit. The generator generates a reference signal whose voltage changes with respect to time. The voltage of the reference signal changes with a constant slope in a predetermined first period since the voltage starts changing. The slope of the voltage becomes steeper with respect to time in a second period after the first period. The comparator compares the reference signal and a voltage output from outside, and outputs a comparison result. The counter counts at a predetermined first cycle since the voltage of the reference signal starts changing until the comparison result is inverted. The first storage circuit stores a first count value corresponding to a reset voltage of the converter when it is reset before the electric signal is transferred from the photoelectric converter. The second storage circuit stores a second count value corresponding to a signal voltage of the converter after the electric signal is transferred from the photoelectric converter. The analog-to-digital converter converts the voltage output from the pixel into a digital signal, and outputs a difference between the first count value and the second count value, and the first count value with a predetermined number of bits. The correction unit corrects a digital signal output from the image sensor. The correction unit corrects the difference based on the first count value, and is implemented by one or more processors, circuitry or a combination thereof.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Figure 1:
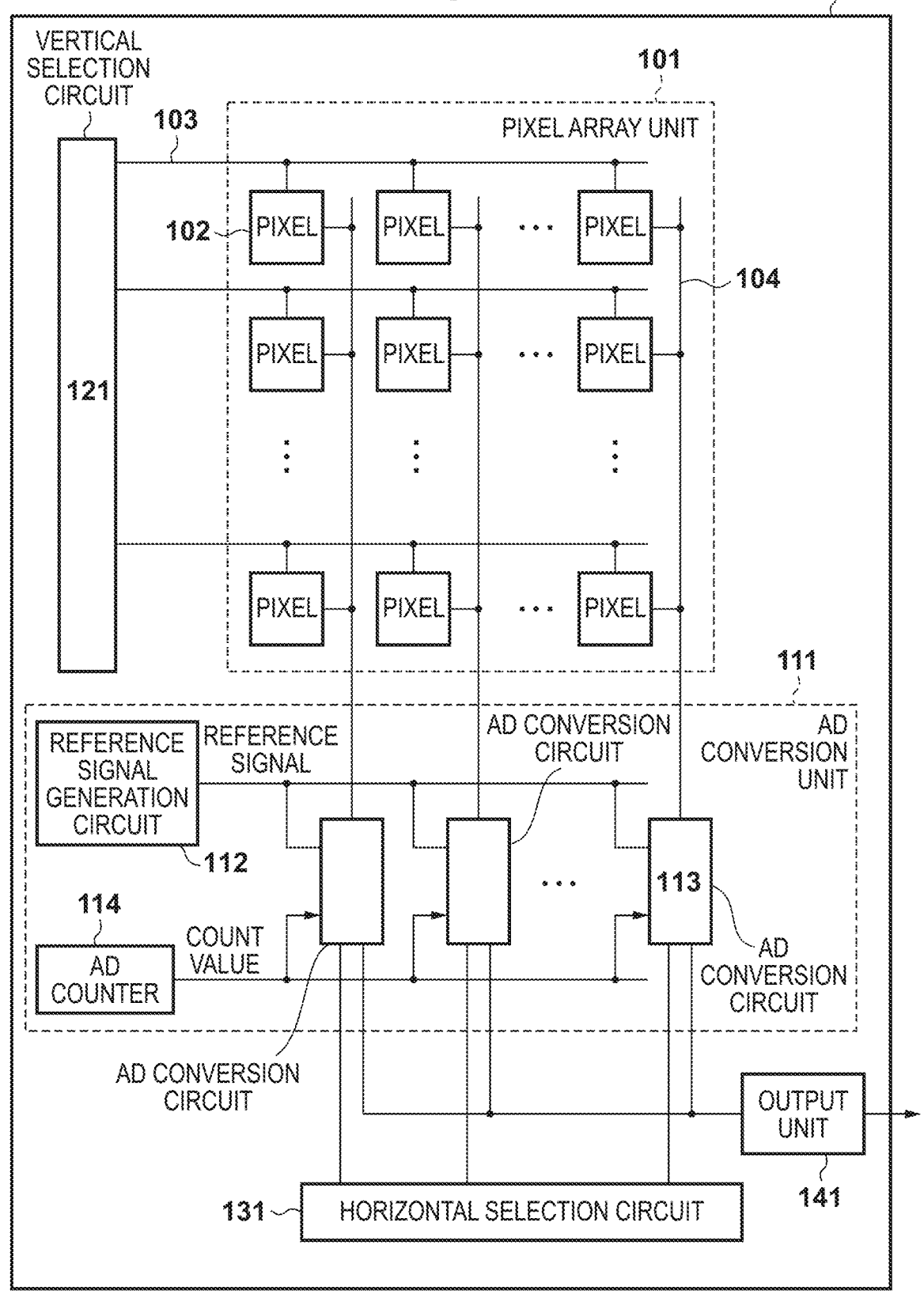
FIG. 1 is a block diagram showing a schematic configuration of an image sensor according to a first embodiment.

Hereinafter, embodiments will be described in detail with reference to the attached drawings. Note, the following embodiments are not intended to limit the scope of the disclosure, and limitation is not made a disclosure that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a schematic configuration of an image sensor 100 according to an embodiment. The image sensor 100 includes a pixel array unit 101, an analog-to-digital (AD) conversion unit or an AD converter 111, a vertical selection circuit 121, a horizontal selection circuit 131, and an output unit 141.

A plurality of pixels 102 are arranged in a two-dimensional array in the pixel array unit 101. When an output of the vertical selection circuit 121 is input to the pixels arranged in the row via a pixel drive pulse wiring 103, selection switches of the pixels in the predetermined row are turned on, and the amplification transistors of the pixels in the row are connected to output lines 104. The configuration of each pixel 102 will be described later with reference to FIG. 2. One output line 104 may be provided for each pixel column or in every N pixel columns (N is a natural number which is greater than 1), or a plurality of output lines 104 may be provided for each pixel column. It is also possible to arrange the same number of AD conversion circuits 113 as the number of pixels and provide the output line 104 for each pixel.

The AD conversion unit 111 has a reference signal generation circuit 112, a plurality of AD conversion circuits 113 each arranged for each output line 104, and an AD counter 114.

The AD conversion circuit 113 converts an output voltage of the pixel in the corresponding column of the row selected by the vertical selection circuit 121, which is input from the outside of the AD conversion circuit 113 via the output line 104, into a digital signal and holds it. Then, the digital signals of the columns sequentially selected by the horizontal selection circuit 131 are output to the outside of the image sensor 100 via the output unit 141. By sequentially performing this reading operation while changing the row selected by the vertical selection circuit 121, the two-dimensional image signal is read out from the image sensor 100.

Figure 2:
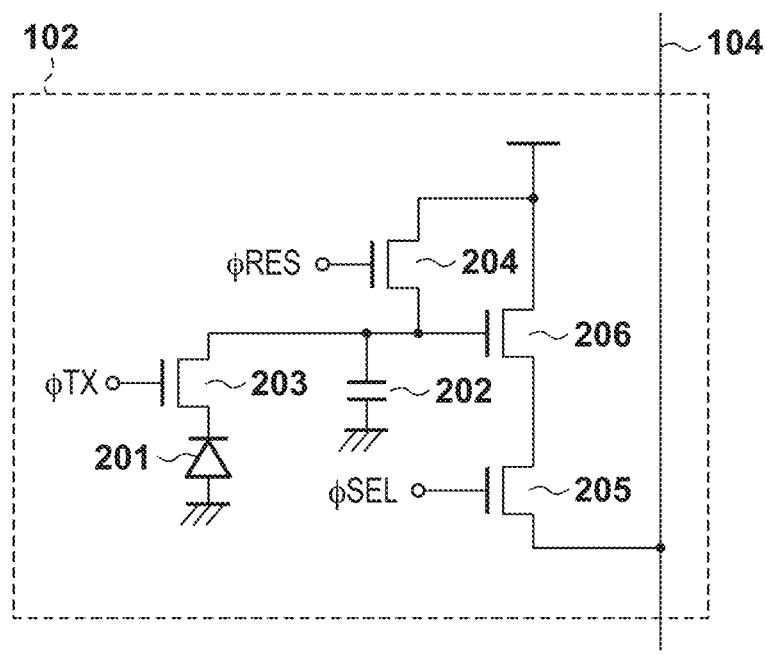
FIG. 2 is an equivalent circuit diagram of a pixel of the image sensor according to the first embodiment.
Figure 3:
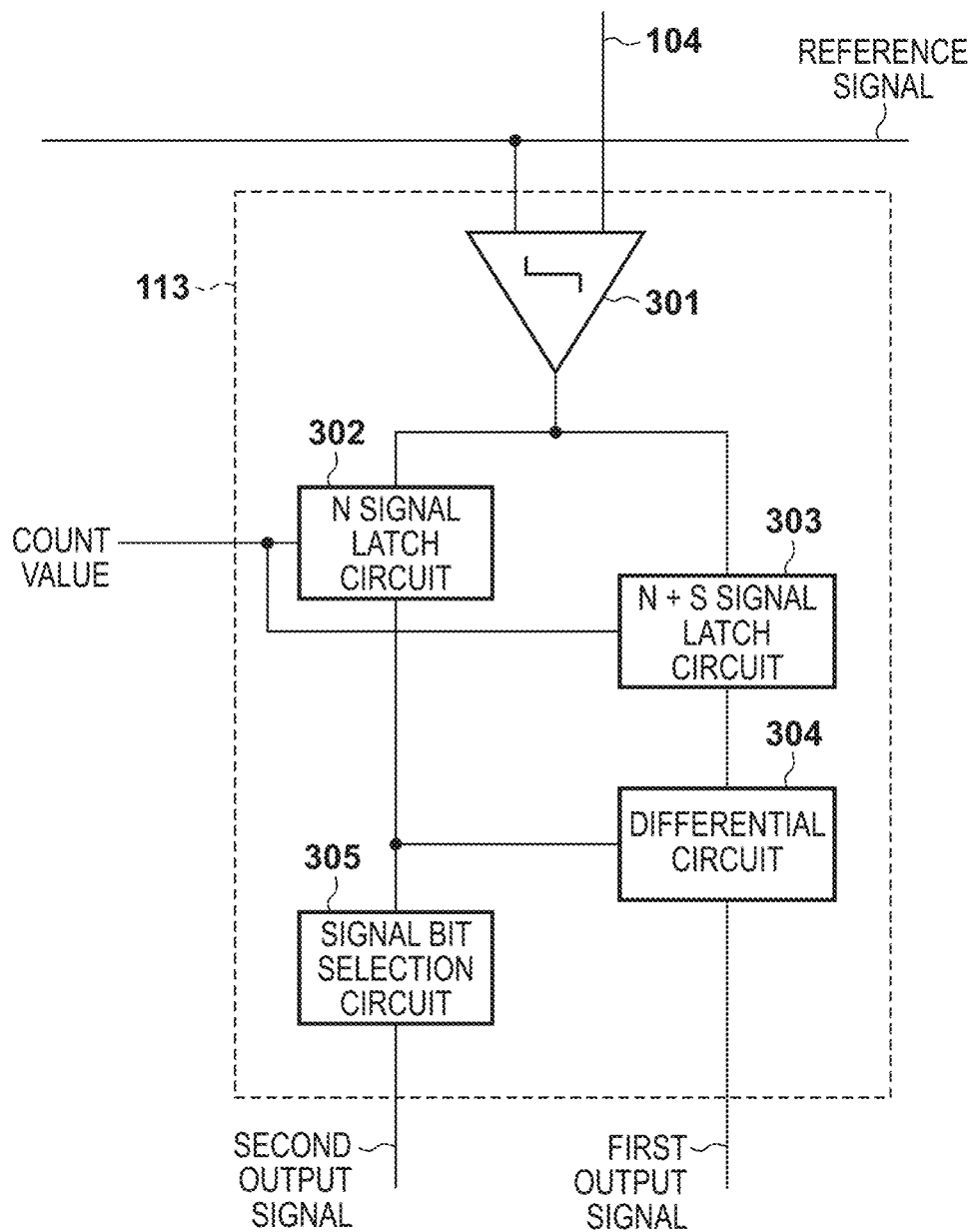
FIG. 3 is a block diagram showing a schematic configuration of an AD conversion circuit of the image sensor according to the first embodiment.

FIG. 2 is an equivalent circuit diagram of the pixel 102 in the present embodiment, and FIG. 3 is a block diagram showing a schematic configuration of the AD conversion circuit 113 of the present embodiment which is arranged for each row.

In FIG. 2, the pixel 102 includes a photodiode (PD) 201, which is a photoelectric conversion element that generates electric charge (or hole, an electric signal) according to the amount of incident light, a floating diffusion (FD) 202 which converts signal charge into a signal voltage, a transfer switch 203 that transfers the electric charge accumulated in the PD 201 to the FD 202, a reset switch 204 for resetting the FD 202 to a reset voltage, a selection switch 205 for selecting a pixel, and an amplification transistor 206 for outputting the signal voltage converted by the FD 202 from the pixels.

The transfer switch 203 is controlled by a control signal φTX, and is turned on when the control signal φTX is High (H) and turned off when the control signal φTX is Low (L). The reset switch 204 is controlled by a control signal ORES, and is turned on when the control signal ORES is H and turned off when the control signal ORES is L. The selection switch 205 is controlled by a control signal φSEL, and is turned on when the control signal φSEL is H and turned off when the control signal φSEL is L.

The AD conversion circuit 113 shown in FIG. 3 includes a comparator 301, an N signal latch circuit 302, an N+S signal latch circuit 303, a differential circuit 304, and a signal bit selection circuit 305, and adopts a single slope AD conversion method as its AD conversion method.

Figure 4:
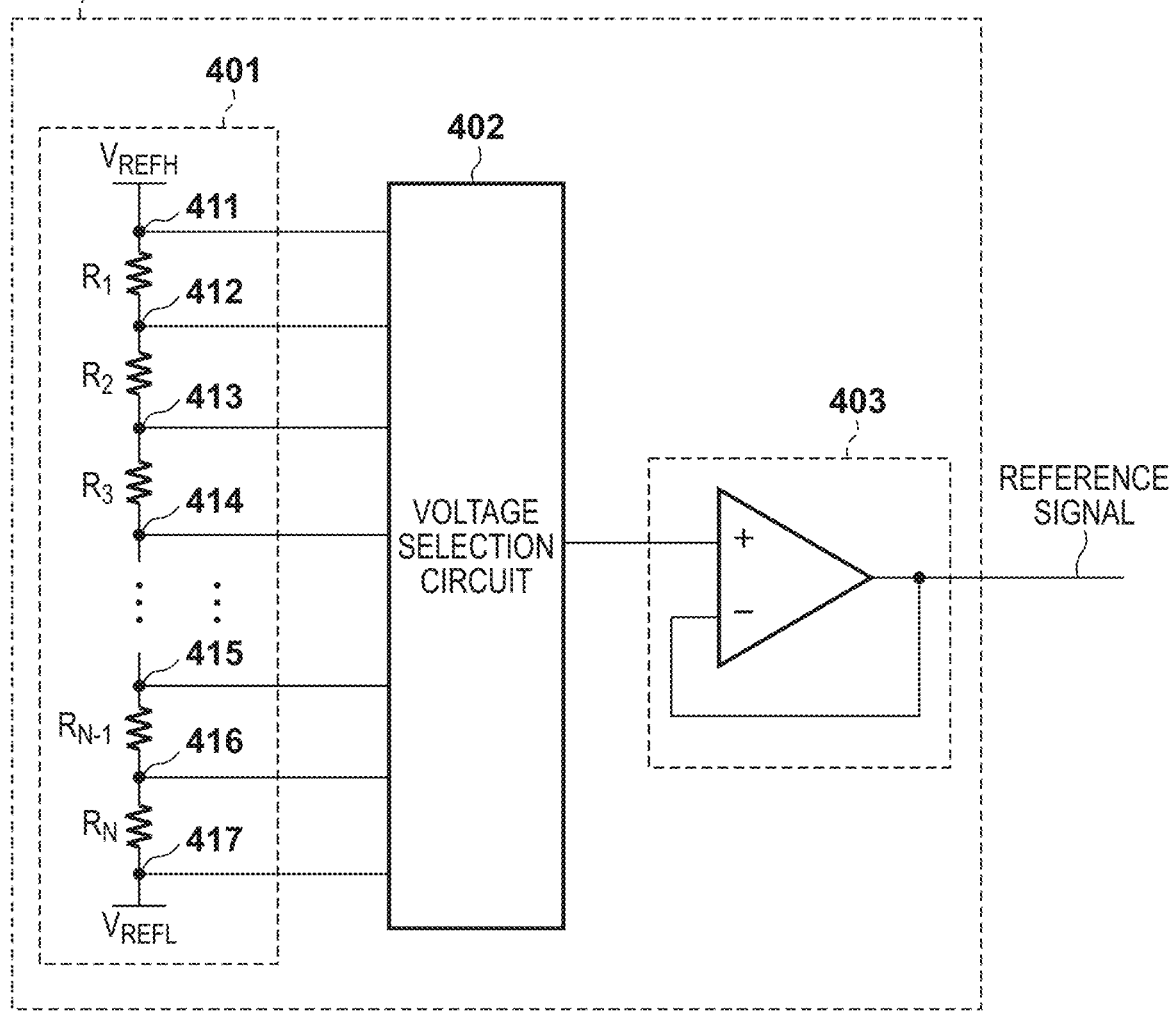
FIG. 4 is a block diagram showing a schematic configuration of a reference signal generation circuit according to the first embodiment.

FIG. 4 is a block diagram showing a schematic configuration of the reference signal generation circuit 112. The reference signal generation circuit 112 includes a series resistance group 401 consisting of a large number of resistors, a voltage selection circuit 402, and a voltage follower 403. In the present embodiment, the series resistance group 401 is composed of resistors $R_1$ to $R_N$, and the upper limit voltage $V_{REFH}$ of a reference signal and the lower limit voltage $V_{REFL}$ of the reference signal are applied to the ends of the series resistance group 401. Each of contacts 411 to 417 provides a voltage obtained by dividing the voltage across $V_{REFH}$ and $V_{REFL}$ by the resistors $R_1$ to $R_N$.

Further, during an AD conversion period, the voltage selection circuit 402 changes a potential from $V_{REFH}$ (contact 411, one of the two ends) toward the $V_{REFL}$ (the other end) by sequentially selecting a contact 411, a contact 412, a contact 413, and so on, at a constant cycle. The selected voltage is output to the voltage follower 403, which transmits the received voltage to the comparators 301 each arranged for each output line 104.

Among the resistors $R_1$ to $R_N$ of the series resistance group 401, a predetermined number of resistors from the $V_{REFH}$ end have the same resistances, and after the predetermined number, the resistances of the resistors gradually increase as they approach the $V_{REFL}$ end. With this configuration, during the operation of the voltage selection circuit 402, the voltage of the reference signal initially decreases by a constant amount of change with respect to time, and the amount of change gradually increases after a predetermined time has elapsed.

Figure 5:
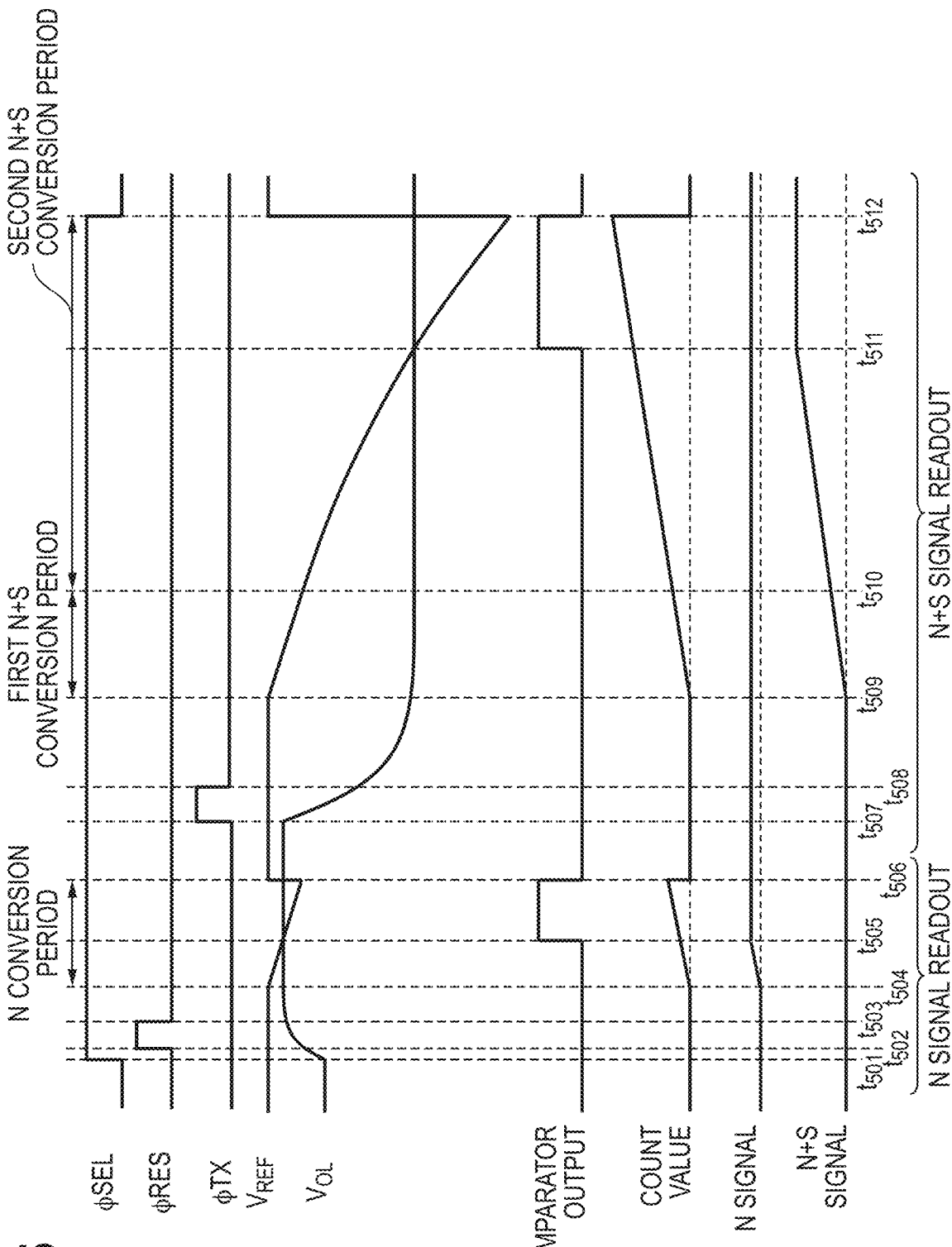
FIG. 5 is a timing chart for reading out the image sensor according to the first embodiment.

FIG. 5 is a timing diagram for explaining the readout of a pixel signal in the present embodiment. In FIG. 5, φSEL, φRES, and φTX indicate signals to be applied to the selection switch 205, reset switch 204, and transfer switch 203 shown in FIG. 2, respectively. $V_{REF}$ shows how the voltage of the reference signal output from the reference signal generation circuit 112 changes, and $V_{OL}$ shows how the voltage of the output line 104 changes. In the following description, the voltage of the reference signal is simply referred to as a "reference signal".

A "comparator output" represents the output of the comparator 301, a "count value" represents the count value input from the AD counter 114, and an "N signal" represents a first count value corresponding to an N signal described later, and an "N+S signal" represents a second count value corresponding to an N+S signal described later.

The pixel signal readout consists of N signal readout and N+S signal readout. The N signal corresponds to a voltage of the FD 202 when it is reset before charge stored in the PD 201 is transferred, and the N+S signal corresponds to a voltage of the FD 202 after the charge stored in the PD 201 is transferred. By calculating the difference between the N signal and the N+S signal, a signal corresponding to the amount of charge stored in the PD 201 is obtained. Hereinafter, operations performed in the order of the N signal readout and the N+S signal readout will be described with reference to the timing chart of FIG. 5.

N Signal Readout ($t_{501}$ to $t_{506}$)

First, the selection switch 205 is turned on ($t_{501}$) to connect the amplification transistor 206 and the output line 104, and the reset switch 204 is turned on ($t_{502}$) then to off ($t_{503}$) to reset the FD 202 before transferring charge. As a result, a voltage $V_{OL}$ of the output line 104 becomes a voltage $V_{RES}$ corresponding to the reset voltage ($t_{503}$).

After that, the AD counter 114 is driven so that the count value increases at a constant cycle, and the reference signal generation circuit 112 is driven so that an amount of change (slope) of the reference signal $V_{REF}$ becomes constant with respect to time or the count value ($t_{504}$ to $t_{506}$). In the present embodiment, this period ($t_{504}$ to $t_{506}$) is referred to as an "N conversion period". In this period, the reference signal $V_{REF}$ is controlled to decrease from a high voltage ($V_{REFH}$) by an amount that includes an amount of voltage represented by $$V_{RES} \pm V_{M1}$$

by using a margin voltage $V_{M1}$ determined from variation in threshold for the amplification transistor 206 and the thermal noise at the time of resetting the FD 202. Note that, during the N conversion period, the cycle of shifting the contacts is adjusted so that the contacts between the predetermined number of resistors whose resistances do not change and which are included in the series resistance group 401 shown in FIG. 4, are selected. By doing so, the slope of the reference signal $V_{REF}$ can be made constant.

In this embodiment, since electrons are accumulated in the PD 201, the reference signal $V_{REF}$ is decreased from a high voltage, but when holes are accumulated in the PD 201, it is raised from a low voltage.

The comparator 301 outputs a comparison result between the reference signal $V_{REF}$ and the voltage $V_{OL}$ of the output line 104, and when the voltages become the same, the output of the comparator 301 is inverted and the first count value is stored in the N signal latch circuit 302 ($t_{505}$). The latch circuit 302 is a first storage or memory circuit. In the present embodiment, the AD counter 114 is used as a common circuit and the AD count value is transmitted to the latch circuit of each column. However, the time until the output of the comparator 301 inverts may be counted by arranging the AD counter 114 in each column and transmitting the clock signal.

N+S Signal Readout ($t_{507}$ to $t_{512}$)

By turning on ($t_{507}$) and then off ($t_{508}$) the transfer switch 203, charge accumulated in the PD 201 is transferred to the FD 202. As a result, the voltage of the FD 202 reset to the reset potential decreases by a voltage ($\Delta V_{FD}$) approximately proportional to the number of transferred charges, and the voltage $V_{OL}$ of the output line 104 decreases by a voltage ($\Delta V_{OL}$) approximately proportional to the $\Delta V_{FD}$. That is, $\Delta V_{OL}$ becomes a voltage that is approximately proportional to the amount of light. Further, in the present embodiment, the voltage $V_{OL}$ of the output line 104 corresponding to the voltage of the 1-D 202 after the transfer switch 203 is turned on ($t_{507}$) then to off ($t_{508}$) when the PD 201 is not irradiated with light during the accumulation period is called $V_{DC}$.

After that, the AD counter 114 is driven so that the count value increases at a constant cycle, and the reference signal generation circuit 112 is driven so that the slope of the reference signal $V_{REF}$ is constant ($t_{509}$ to $t_{510}$). In the present embodiment, this period ($t_{509}$ to $t_{510}$) is referred to as a "first N+S conversion period". In this period, the reference signal $V_{REF}$ is controlled to decrease from a high voltage by an amount that includes an amount of voltage represented by $$V_{DC} \pm V_{M2}$$

by using a margin voltage $V_{M2}$ determined from variation in threshold for the amplification transistor 206 and the thermal noise at the time of resetting the FD 202. For $V_{M2}$, it is preferable that $V_{M2} > V_{M1}$ holds in consideration of the variation in dark current accumulated in the PD 201 during the accumulation period in addition to $V_{M1}$. That is, the first N+S conversion period may be set longer than the N conversion period.

Further, since the variation in the dark current is larger when the accumulation period (exposure time) of the PD 201 is longer, it is preferable to set the first N+S conversion period longer in a case where the accumulation period is long than in a case where the accumulation period is short. Further, since the variation in the dark current is larger when the temperature of the image sensor 100 is higher, it is preferable to set the first N+S conversion period longer in a case where the temperature of the image sensor 100 is high than in a case where the temperature of the image sensor 100 is low.

While the first N+S conversion period, the cycle of shift in the contacts is adjusted so that the contacts between a predetermined number of resistors whose resistances do not change and which are included in the series resistance group 401 shown in FIG. 4, are selected. By doing so, the slope of the reference signal $V_{REF}$ can be made constant. Further, in order to make the slope of the reference signal $V_{REF}$ in the first N+S conversion period same as that in the N conversion period, the cycle for shifting the contacts may be adjusted in advance so that the number of contacts shifted in the N conversion period is smaller.

Subsequently, the slope of the reference signal $V_{REF}$ is continuously made steeper while keeping a rate of increase in count by the AD counter 114 in the fixed cycle ($t_{510}$ to $t_{512}$). In the present embodiment, this period ($t_{510}$ to $t_{512}$) is referred to as a "second N+S conversion period". During this second N+S conversion period, among the resistors of the series resistance group 401 shown in FIG. 4, it is adjusted such that the contacts between the resistors whose resistances change, after the predetermined number of resistors, are sequentially selected. By doing so, it is possible to continuously make the slope of the reference signal $V_{REF}$ steeper.

During the first N+S conversion period and the second N+S conversion period ($t_{509}$ to $t_{512}$), when the reference signal $V_{REF}$ and the voltage $V_{OL}$ of the output line 104 becomes the same voltage, the output of the comparator 301 is inverted and the second count value is latched in the N+S signal latch circuit 303 ($t_{511}$). The latch circuit 303 is a second storage or memory circuit. By continuously increasing the slope of the reference signal $V_{REF}$ during the second N+S conversion period, it is possible to suppress the gap between digital signals caused by a difference in slopes between the reference signals and, comparing to an AD conversion period when a reference signal having a constant slope is used, it is possible to shorten the AD conversion period.

After the pixel signal has been read out, the horizontal selection circuit 131 sequentially selects columns to read out the digital signals from the selected columns, and the digital signals are output from the image sensor 100 via the output unit 141. When reading out each of the digital signals, a signal obtained by subtracting the digital signal stored in the N signal latch circuit 302 from the digital signal stored in the N+S signal latch circuit 303 using the differential circuit 304 is output as a first output signal. Further, the upper bits or all the bits of the signal stored in the N signal latch circuit 302 are read out as a second output signal according to the number of bits set in the signal bit selection circuit 305 in advance of the read out. Further, if the preset number of bits is 0, the second output signal is not read out.

Here, the readout noise superimposed on the digital signal during AD conversion will be described. In the present specification, unless otherwise specified, the readout noise indicates a random noise superimposed on the readout circuit, and the comparison between the readout noises indicates the comparison between the noises in the correction signal described later at the input of the AD conversion circuit 113.

In the N conversion period of the present embodiment, since the amount of change of the reference signal $V_{REF}$ with respect to time is constant, readout noise is constant regardless of the magnitude of the voltage $V_{OL}$ of the output line 104. That is, the readout noise of the N signal is constant regardless of variation in the threshold of the amplification transistor 206, variation in the voltage of the FD 202 due to the thermal noise at the time of resetting the FD 202, and the like.

Also, during the N+S conversion period, in a case where the magnitude of the voltage $V_{OL}$ of the output line 104 is $$V_{OL} \geq V_{DC} - V_{M2},$$

the comparator 301 is inverted in the first N+S conversion period. In the first N+S conversion period, the slope of the reference signal $V_{REF}$ is equivalent to that in the N conversion period, so the readout noise is equivalent to that in the N conversion period. That is, when the light irradiation is sufficiently small, the comparator 301 is inverted in the first N+S conversion period, and the readout noise becomes constant.

Further, in a case where the magnitude of the voltage $V_{OL}$ of the output line 104 is $$V_{OL} < V_{DC} - V_{M2},$$

the comparator 301 is inverted in the second N+S conversion period. In the second N+S conversion period, the slope of the reference signal $V_{REF}$ becomes steeper when the voltage $V_{OL}$ of the output line 104 is lower. The readout noise in the single slope AD conversion method is smaller when the amount of change of the reference signal $V_{REF}$ with respect to time is smaller, and is larger when the amount of change of the reference signal $V_{REF}$ with respect to time is larger. Therefore, the readout noise is larger when the $V_{OL}$ is smaller. That is, the readout noise is small when the light intensity is small and the obtained signal is easily affected by the readout noise, and the readout noise is large when the light intensity is large and the obtained signal is not easily affected by the readout noise, with the readout noise continuously changing with respect to the light intensity.

Further, when the slope of the reference signal $V_{REF}$ is sufficiently large, the readout noise increases in proportion to the slope of the reference signal $V_{REF}$. Further, since the distribution of photons is Poisson distribution, the signal-to-noise ratio (SNR) increases with the increase in the amount of light in the rate of the $0.5^{th}$ power of the amount of light. Therefore, in order to prevent the SNR from deteriorating with respect to the increase in the amount of light, it is preferable that the increase in the slope of the reference signal $V_{REF}$ in the second N+S conversion period is controlled such that the disadvantage of the increased slope does not exceed the advantage of the increased amount of light that improves the SNR. That is, by setting the derivative of the reference signal $V_{REF}$ with respect to time or count value to the $0.5^{th}$ power of the time or count value, it is possible to prevent the SNR from decreasing with respect to the increase in the amount of light. From the above, it is preferable that the reference signal $V_{REF}$ in the second N+S conversion period is controlled in accordance with a $1.5^{th}$-order function of time or count value.

Figure 6:
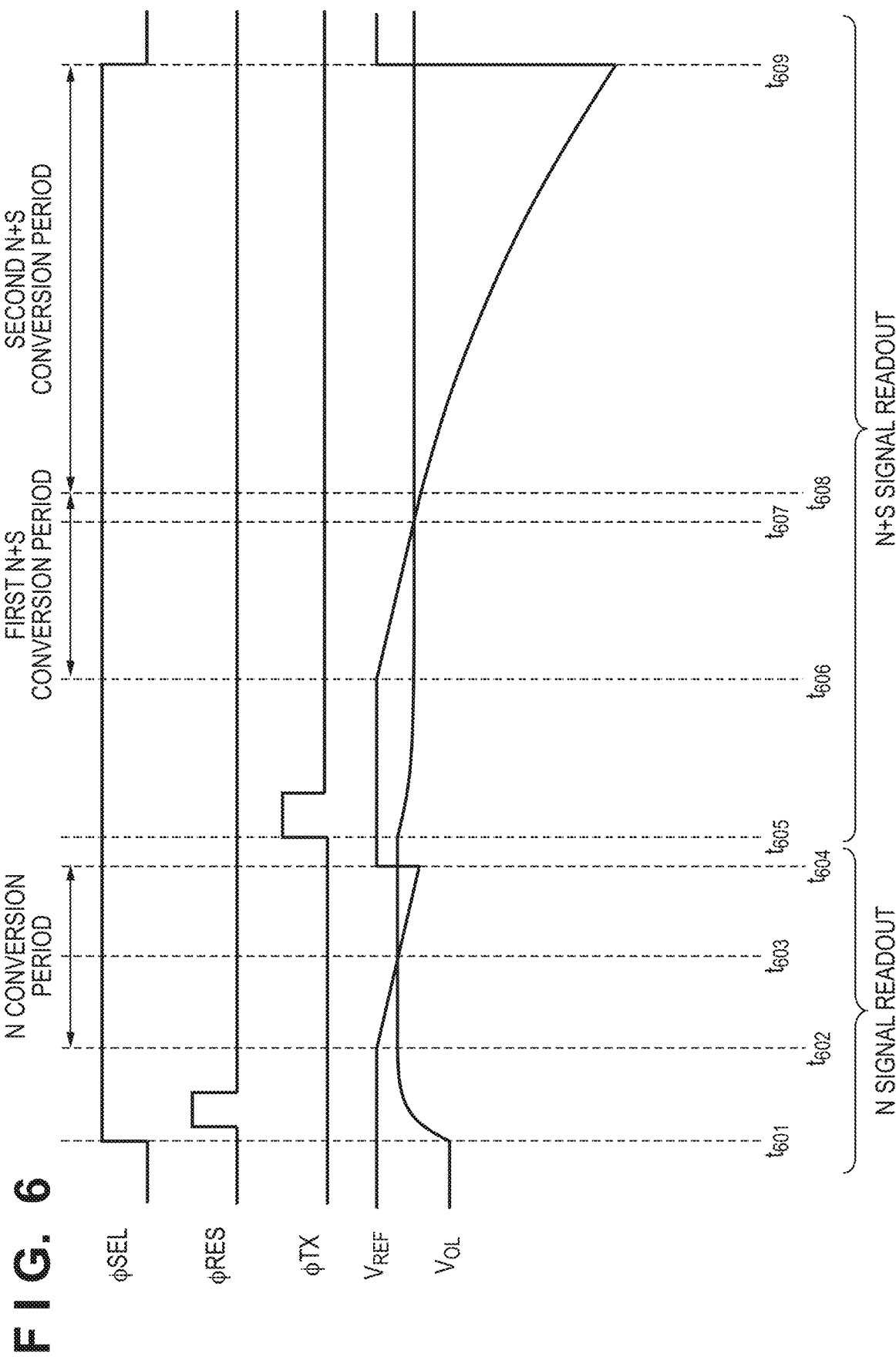
FIG. 6 is a timing chart for reading out signals from the image sensor at a time of low noise readout according to the first embodiment.

Further, FIG. 6 is a timing chart for explaining pixel signal readout when the readout noise is reduced by narrowing the voltage range for AD conversion in the N+S signal readout. Since each signal shown in FIG. 6 represents the same signal shown in FIG. 5, description thereof will be omitted here.

The slope of the reference signal $V_{REF}$ is gentler, and the reference signal $V_{REF}$ at the end of the second N+S conversion period is higher comparing to a case in the normal readout shown in FIG. 5. By lengthening the cycle for shifting the contacts shown in FIG. 4, the slope of the reference signal $V_{REF}$ can be made gentler.

By doing so, the voltage range of the voltage $V_{OL}$ of the output line 104 that can be AD-converted becomes narrower than that at the time of normal readout, however, since the slope of the reference signal $V_{REF}$ is gentle, the readout noise becomes small.

In addition, since the slope of the reference signal $V_{REF}$ is gentler than that at the time of normal readout, and the time required until the $V_{OL}$ satisfies the condition of $$V_{OL}=V_{DC}-V_{M2}$$

becomes long, it is preferable to lengthen the first N+S conversion period.

As described above, according to the first embodiment, AD conversion can be performed at high speed without generating a gap between signals and readout noises.

In the above-mentioned example, the case where the AD conversion circuit is arranged for each column has been described, but the disclosure is not limited to this, and can be appropriately applied to a known AD conversion circuit.

Second Embodiment

Next, a second embodiment will be described. In the second embodiment, a specific configuration example of an image capturing apparatus will be described.

Figure 7:
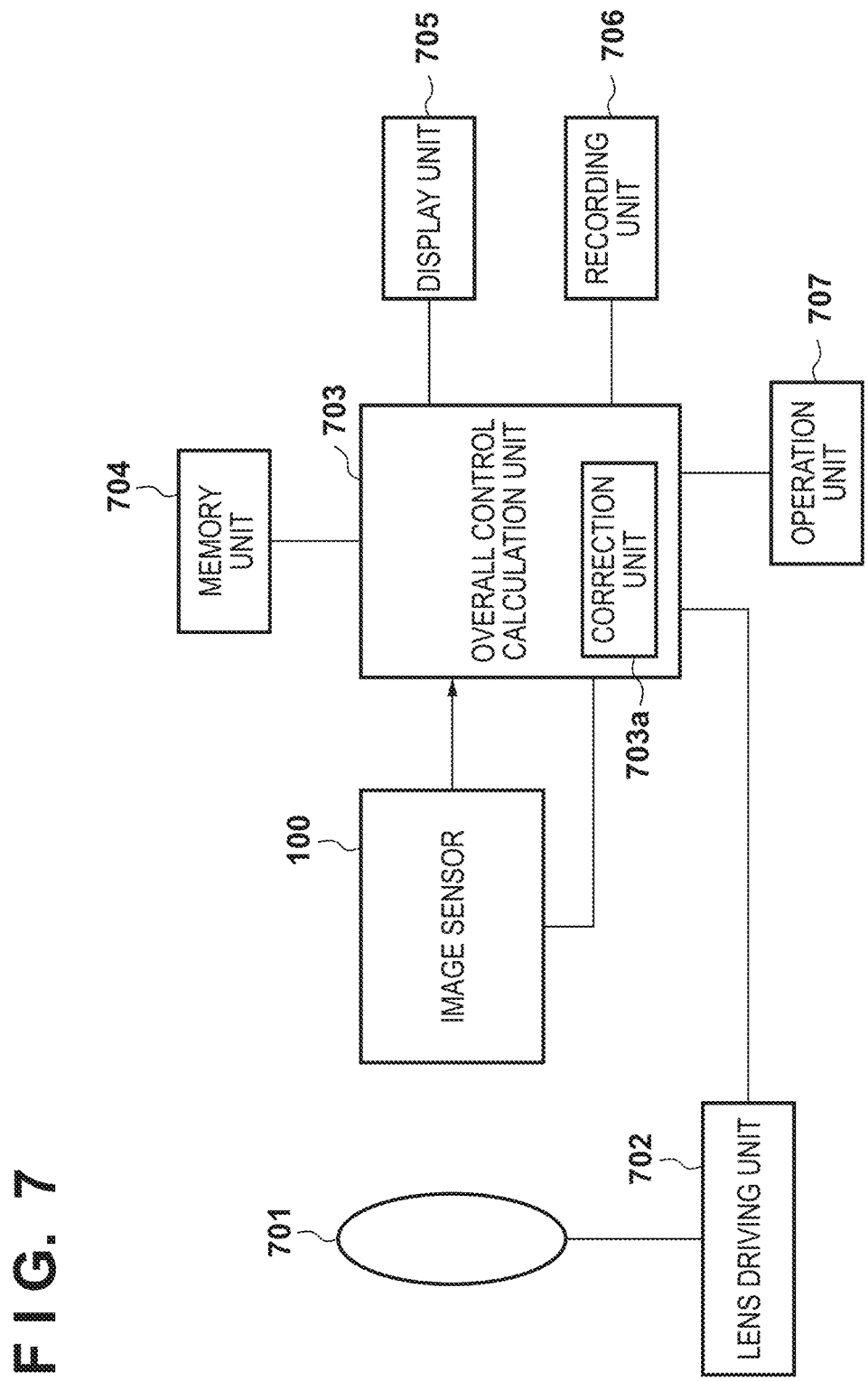
FIG. 7 is a block diagram showing a schematic configuration of an image capturing apparatus according to a second embodiment.

FIG. 7 is a block diagram showing a configuration example of an image capturing apparatus such as a digital camera equipped with the image sensor 100 described in the first embodiment.

A photographing lens 701 forms an optical image of a subject on the image sensor 100. A lens driving unit 702 performs zoom control, focus control, aperture control, and the like of the photographing lens 701. An overall control calculation unit 703 functions as a signal processing unit that performs processing such as generation of a correction signal and an image using the first output signal and the second output signal output from the image sensor 100, and also controls the entire image capturing apparatus.

A memory unit 704 functions as a memory for temporarily storing image data. A display unit 705 is a device that displays various information and images. A recording unit 706 is a detachable, for example, semiconductor memory for recording and reading image data. An operation unit 707 includes various interfaces of the image capturing apparatus, and the overall control calculation unit 703 controls each configuration of the image capturing apparatus according to an instruction from the user via the operation unit 707.

Figure 8:
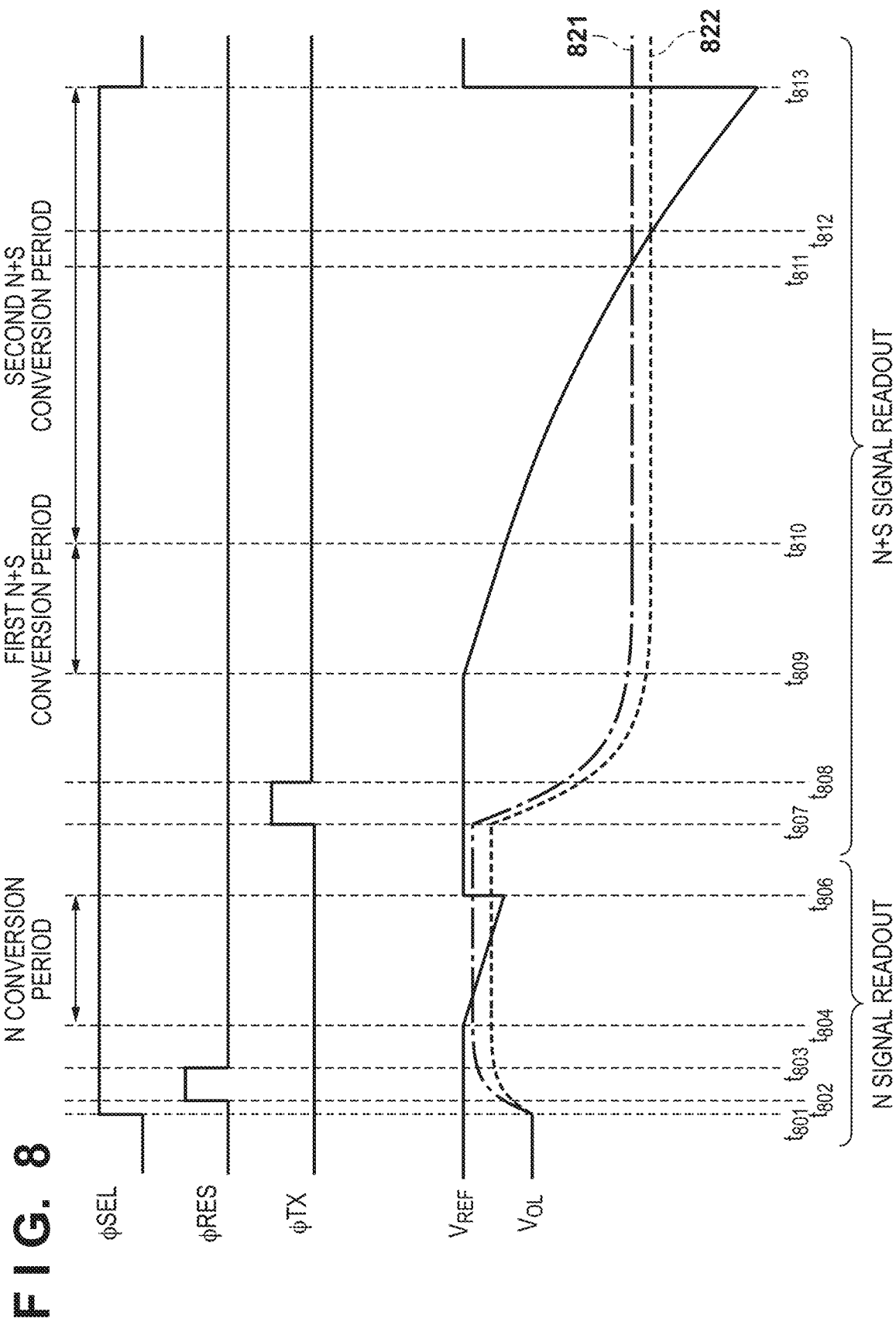
FIG. 8 is a timing chart showing a change in $V_{OL}$ when same electric charge is accumulated in PDs of two pixels having different reset level voltages according to the second embodiment.

FIG. 8 is a diagram showing a change in the voltage $V_{OL}$ of the output line 104 when the same amount of charge is accumulated in the PDs 201 of two pixels across which reset voltages of different levels (hereinafter referred to as "reset levels") are applied at the time of the N signal readout. The change in the voltage $V_{OL}$ of the output line 104 when the reset level is high is shown by a dot-dash line 821, and the change in the voltage $V_{OL}$ of the output line 104 when the reset level is low is shown by a dotted line 822.

In the N+S signal read out, when the reset level is high (821), the output of the comparator 301 is inverted at the timing $t_{811}$, and the AD count value corresponding to the timing $t_{811}$ is held in the N+S signal latch circuit 303. On the other hand, when the reset level is low (822), the output of the comparator 301 is inverted at the timing $t_{812}$, and the AD count value corresponding to the timing $t_{812}$ is held in the N+S signal latch circuit 303. The slope of the reference signal $V_{REF}$ at the timing $t_{812}$ is steeper than the slope of the reference signal $V_{REF}$ at the timing $t_{811}$. Therefore, when the reset level is low, the first output signal is smaller than that when the reset level is high, even if the $\Delta V_{OL}$ is the same.

Figure 9:
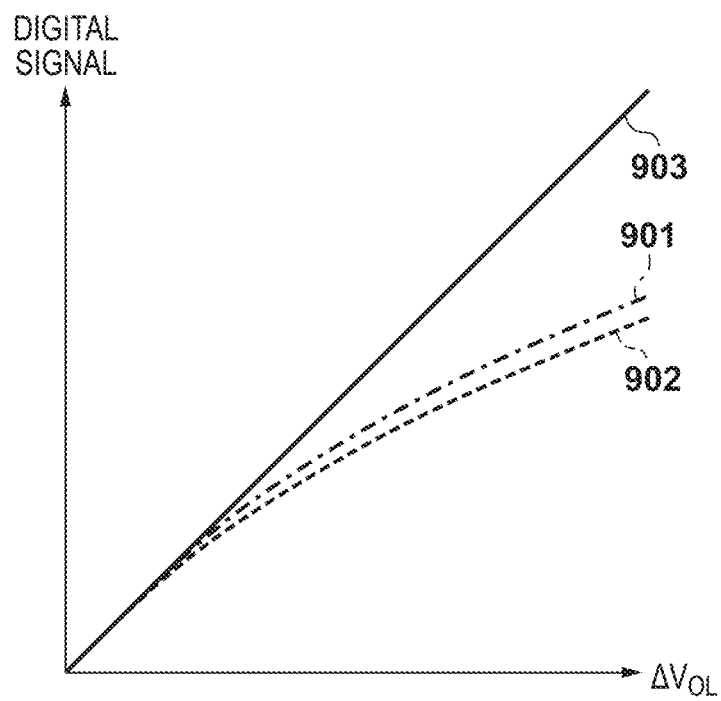
FIG. 9 is a diagram schematically showing $\Delta V_{OL}$ dependencies of a first output signal when a reset level is high and a reset level low according to the second embodiment.

FIG. 9 is a diagram schematically showing the $\Delta V_{OL}$ dependency of the first output signal in cases where the reset level is high (901) and low (902), and the corrected signal (903). A correction unit 703a provided in the overall control calculation unit 703 performs the correction including a case where the relationship between the $\Delta V_{OL}$ and the digital signal is different due to the difference in the reset level. Note that the correction unit may be added between the AD conversion unit 111 and the output unit 141 in the image sensor 100, and the corrected signal may be used as the output signal of the image sensor 100.

Figure 10:
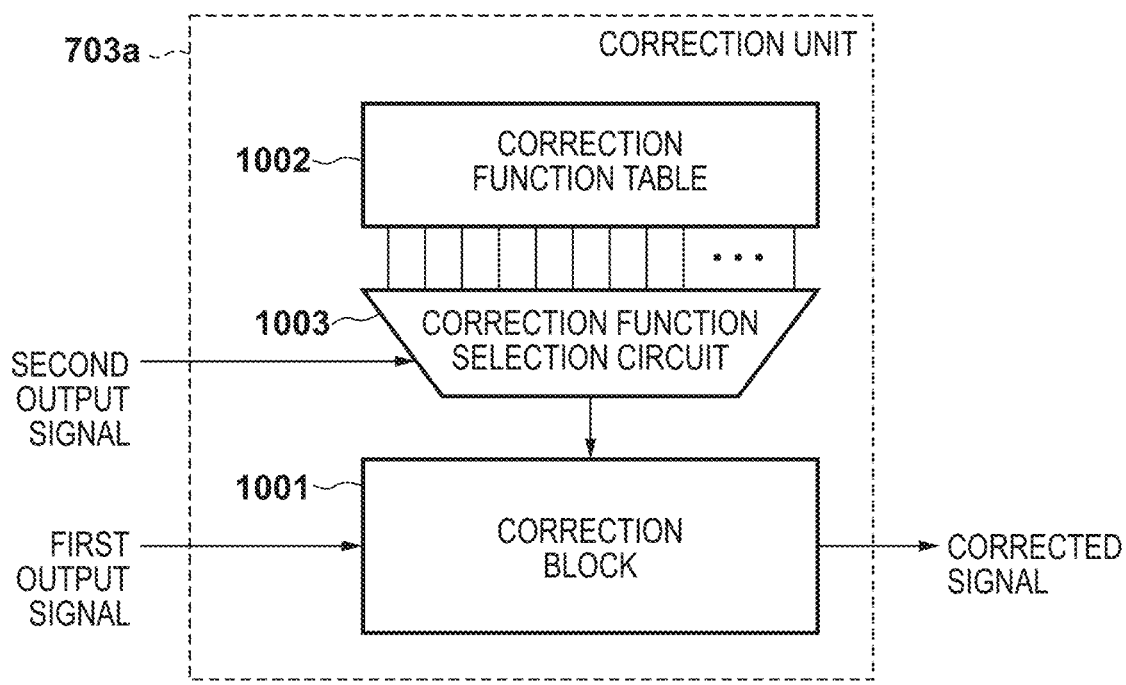
FIG. 10 is a block diagram showing a schematic configuration of a correction unit according to the second embodiment.
Figure 11:
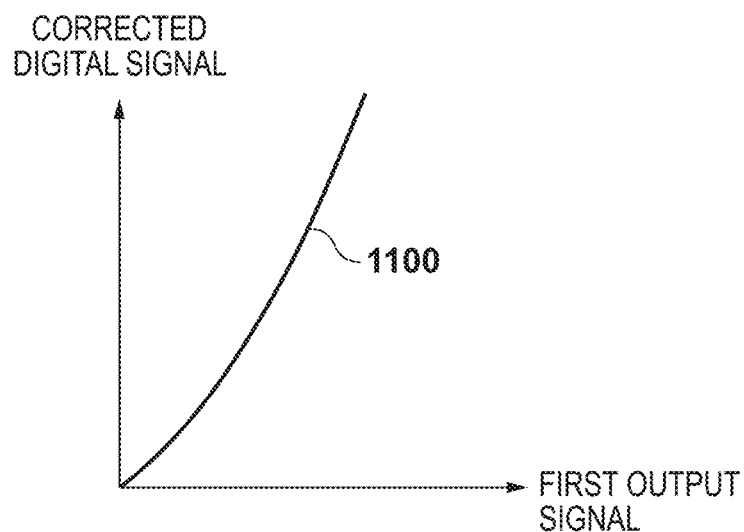
FIG. 11 is a diagram showing an example of a correction function according to the second embodiment.
Figure 12:
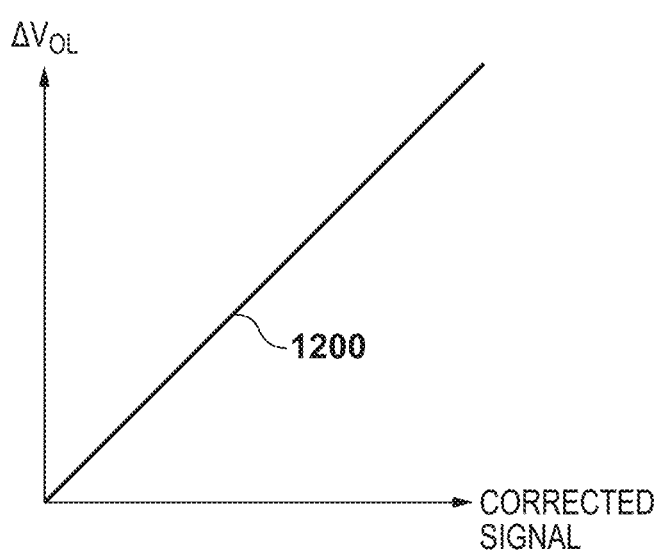
FIG. 12 is a diagram schematically showing a relationship between $\Delta V_{OL}$ and a corrected signal according to the second embodiment.

FIG. 10 is a diagram schematically showing the correction unit 703a. The correction unit 703a includes a correction block 1001 that corrects the first output signal, a correction function table 1002 that holds correction functions for respective noise levels, and a correction function selection circuit 1003 that selects a correction function from the correction function table 1002 according to the value of the second output signal. FIG. 11 is a diagram showing an example of a correction function 1100, and shows the relationship between the corrected digital signal and the first output signal. Further, FIG. 12 shows an example of the relationship between $\Delta V_{OL}$ and the corrected signal.

First, the correction function selection circuit 1003 selects the correction function 1100 from the correction function table 1002 according to the number of bits of the second output signal and its value, and transmits the correction function 1100 to the correction block 1001. Even if the second output signal is not output, the correction function 1100 corresponding to the state that the second output signal is 0 bits is selected and transmitted to the correction block 1001. In the correction block 1001, the first output signal is input to the correction function 1100 to obtain the corrected signal. By doing so, it is possible to obtain a signal having a linear relationship with respect to $\Delta V_{OL}$ (1200) from the first output signal having a non-linear relationship with respect to $\Delta V_{OL}$.

Increasing the number of bits of the second output signal can reduce the error due to correction, and decreasing the number of bits of the second output signal can reduce the amount of data transmitted from the image sensor 100. Therefore, for example, it is conceivable to change the number of bits of the second output signal according to the shooting mode set by the user operation of a shooting mode selection switch included in the operation unit 707. As an example, if the shooting mode is set to a single shooting mode, the number of bits of the second output signal is increased, and if the shooting mode is set to a mode required to perform shooting operation continuously, such as a continuous shooting mode, a movie shooting mode, and the like, the number of bits in the second output signal is reduced.

As described above, according to the second embodiment, AD conversion can be performed at high speed without generating a gap between signals and readout noises.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-024664, filed on Feb. 17, 2020 which is hereby incorporated by reference herein in its entirety.

What is claimed is:

1. An image sensor comprising:
a plurality of pixels each including a photoelectric converter that generates an electric signal corresponding to an amount of incident light and a converter that converts the electric signal transmitted from the photoelectric converter to a voltage;
an analog-to-digital converter comprising:
a generator that generates a reference signal whose voltage changes with respect to time, wherein the voltage of the reference signal changes with a constant slope in a predetermined first period since the voltage starts changing, and the slope of the voltage becomes steeper with respect to time in a second period after the first period;
a comparator that compares the reference signal and a voltage output from outside, and outputs a comparison result;
a counter that counts at a predetermined first cycle since the voltage of the reference signal starts changing until the comparison result is inverted,
a first storage circuit for storing a first count value corresponding to a reset voltage of the converter when it is reset before the electric signal is transferred from the photoelectric converter, and
a second storage circuit for storing a second count value corresponding to a signal voltage of the converter after the electric signal is transferred from the photoelectric converter,
wherein the analog-to-digital converter converts the voltage output from the pixel into a digital signal, outputs a difference between the first count value and the second count value, and outputs the first count value, and
a correction unit that corrects the difference using a correction function, selected from a plurality of correction functions, corresponding to the first count value, the functions capable of converting a non-linear relationship to a linear relationship,
wherein the correction unit is implemented by one or more processors, circuitry or a combination thereof.

2. The image sensor according to claim 1, wherein the change in the voltage of the reference signal in the second period is expressed as a $1.5^{th}$-order function of time or the first cycle.

3. The image sensor according to claim 1, wherein the generator
has a resistor group in which a predetermined number of resistors with a constant resistance and a plurality of resistors with larger resistances than the constant resistance which are different from each other are connected in series in ascending order of resistance, and
generates the reference signal by applying a first voltage at one end of the resistor group and a second voltage at the other end of the resistor group, and sequentially reading out voltages from a plurality of contacts between the plurality of resistors connected between the first voltage and the second voltage, from one of the ends of the resistor group toward the other end of the resistor group at a predetermined second cycle.

4. The image sensor according to claim 3, wherein the generator sequentially reads out the voltages from the end at which the resistor with a smallest resistance is arranged toward the end at which the resistor with a largest resistance is arranged.

5. The image sensor according to claim 3, wherein the generator sequentially reads out the voltages from the end at which the resistor with a largest resistance is arranged toward the end at which the resistor with a smallest resistance is arranged.

6. The image sensor according to claim 3, wherein the resistance of each of the resistors forming the resistor group and the second cycle are set so that the voltage of the reference signal in the second period is expressed by a $1.5^{th}$-order function of time or the first cycle.

7. The image sensor according to claim 1, wherein in a case where an exposure period of the photoelectric converter is a third period, the first period is made longer than a case where the exposure time is a fourth period shorter than the third period.

8. The image sensor according to claim 1, wherein in a case where temperature of the image sensor is a first temperature, the first period is made longer than in a case where the temperature of the image sensor is a second temperature lower than the first temperature.

9. The image sensor according to claim 1, wherein in a case where the slope of the reference signal is set to be a first slope which is gentler than a threshold, the first period is made longer than in a case where the slope is not set to be the first slope.

10. The image sensor according to claim 1, wherein the generator is controlled such that the comparator compares the reset voltage and the reference signal during the first period, and compares the signal voltage and the reference signal during the first period and the second period.

11. The image sensor according to claim 10, wherein a period in which the voltage of the reference signal is changed in order to compare the reset voltage and the reference signal is shorter than the first period for comparing the signal voltage with the reference signal.

12. An image capturing apparatus comprising:
an image sensor including:
a plurality of pixels each including a photoelectric converter that generates an electric signal corresponding to an amount of incident light and a converter that converts the electric signal transmitted from the photoelectric converter to a voltage;
an analog-to-digital converter having:

a generator that generates a reference signal whose voltage changes with respect to time, wherein the voltage of the reference signal changes with a constant slope in a predetermined first period since the voltage starts changing, and the slope of the voltage becomes steeper with respect to time in a second period after the first period;

a comparator that compares the reference signal and a voltage output from outside, and outputs a comparison result;

a counter that counts at a predetermined first cycle since the voltage of the reference signal starts changing until the comparison result is inverted;

a first storage circuit for storing a first count value corresponding to a reset voltage of the converter when it is reset before the electric signal is transferred from the photoelectric converter; and a second storage circuit for storing a second count value corresponding to a signal voltage of the converter after the electric signal is transferred from the photoelectric converter;

wherein the analog-to-digital converter converts the voltage output from the pixel into a digital signal, and outputs a difference between the first count value and the second count value, and the first count value with a predetermined number of bits; and a correction unit that corrects a digital signal output from the image sensor, wherein the correction unit corrects the difference based on the first count value using a correction function, selected from a plurality of correction functions, corresponding to the first count value, the functions capable of converting a non-linear relationship to a linear relationship, and wherein the correction unit is implemented by one or more processors, circuitry or a combination thereof.

13. The image capturing apparatus according to claim 12 further comprising a setting unit that sets a shooting mode, wherein, in a case where a mode to perform continuous shooting is set as the shooting mode, the predetermined number of bits are made smaller than in a case where a single shooting is set, and wherein the setting unit is implemented by one or more processors, circuitry or a combination thereof.

* * * * *